US005709088A

United States Patent [19]

Acaster

[11] Patent Number: 5,709,088

[45] Date of Patent: Jan. 20, 1998

[54] ENGINE

[76] Inventor: James Graeme Acaster, 6/17 Succoth Court, Succoth Park, Edinburgh EH12 6BY, Scotland

[21] Appl. No.: 605,113

[22] PCT Filed: Sep. 2, 1994

[86] PCT No.: PCT/GB94/01903

§ 371 Date: Feb. 22, 1996

§ 102(e) Date: Feb. 22, 1996

[87] PCT Pub. No.: WO95/06806

PCT Pub. Date: Mar. 9, 1995

[30] Foreign Application Priority Data

Sep. 2, 1993 [GB] United Kingdom .................... 9318205

[51] Int. Cl.[6] .................................................... F02C 5/06

[52] U.S. Cl. .......................................... 60/624; 60/39.38

[58] Field of Search .................................. 60/624, 39.75, 60/39.38

[56] References Cited

U.S. PATENT DOCUMENTS

| | | | |
|---|---|---|---|
| 1,308,373 | 7/1919 | Rombach | 60/624 |
| 2,665,668 | 1/1954 | Ward | 60/624 |
| 3,242,665 | 3/1966 | Flater | 60/624 |
| 5,479,780 | 1/1996 | McCabe | 60/624 |

FOREIGN PATENT DOCUMENTS

| | | | |
|---|---|---|---|
| 425265 | 12/1937 | Belgium . | |
| 2142294 | 1/1973 | France . | |
| 592781 | 2/1934 | Germany | 60/624 |
| 6407871 | 1/1965 | Netherlands . | |
| 261071 | 11/1926 | United Kingdom | 60/624 |

*Primary Examiner*—Michael Koczo

*Attorney, Agent, or Firm*—Young & Basile, P.C.

[57] ABSTRACT

An internal combustion engine has an annular rotor (2) arranged to rotate around a stator (6). The stator has a pair of combustion cylinders (19) extending therethrough with each cylinder containing a slideable piston (18). The pistons are coupled to a central rotating shaft (4) which produces antiphase motion of the pistons in their respective cylinders. Combustible fluid is fed into each of the cylinders (19) in turn to be compressed by the action of the pistons (18). The rotor (2) has a first angular section (16) which provides for an air/fuel mixture to be drawn into the cylinders during retraction of the pistons, a second angular section (40) which provides for sealing an opening in the end of the cylinders when the pistons are extending to compress the air/fuel mixture, and a third angular section (42) which has a number of turbine blades which are arranged to be driven by combustion products exiting from a cylinder when compressed fluid therein is ignited.

19 Claims, 8 Drawing Sheets

ENGINE

The present invention relates primarily to an internal combustion rotary engine but also to a pump or compressor.

Internal combustion engines of various forms have been known and proposed over the years and are generally in the form of a reciprocating piston engine or a rotary piston (sometimes referred to as a Wankel) engine. Other known forms of engine include jet turbine engines, but each of these generally known designs has one or more of a number of different problems or limitations. For instance in a reciprocating piston driven crankshaft the drive imparted to the crankshaft by the connecting rod and piston occurs at a relatively small radius from the center of rotation of the crankshaft (which thereby controls the stroke of that same piston and subsequently the maximum rotational speed of the engine) and thus the torque generated is also relatively small. That torque also varies in magnitude according to the angular displacement of the crankshaft. Moreover reciprocating piston engines require relatively large flywheels to "smooth out" the extreme variations in torque and maintain the momentum of the crankshaft. Rotary piston engines on the other hand have similar torque due to the piston force being applied at a relatively small radius, and suffer particularly from sealing problems at the tips of the rotors and high fuel consumption. Since power output is directly related to the product of torque and rotational speed, increasing the magnitude of both will increase the output power. Turbine engines tend to be complex and the delivery characteristics of their power is not suited to applications such as vehicles or portable power tools.

It is an object of the present invention to avoid or minimize one or more of the foregoing disadvantages.

According to a first aspect of the present invention there is provided an internal combustion engine comprising an inner stator and an annular rotor arranged to rotate around the stator, the stator comprising:

at least one combustion chamber and fluid supply means for introducing combustible fluid into the or each chamber;

compression means for compressing combustible fluid in the or each chamber; and ignition means for igniting compressed combustible fluid in the or each chamber, the rotor having turbine reaction means and the stator and rotor being formed and arranged so as to provide a pathway for conducting combustion products from said chamber into driving engagement with the turbine reaction means so as to cause the rotor to rotate around the stator.

In a preferred embodiment of the present invention the rotor comprises angularly distributed induction, compression and exhaust sectors which communicate in turn with said at least one combustion chamber, the induction sector being coupled to a fuel inlet for communicating fuel to the combustion chamber via a chamber opening, the compression sector comprising a wall for sealably engaging said chamber opening to confine fuel within the chamber, and the exhaust sector providing said turbine reaction means which are arranged to be exposed to said combustion products.

According to a second aspect of the present invention there is provided a rotary engine having induction, compression, and combustion and exhaust phases and comprising an annular rotor having angularly distributed induction, compresssion and exhaust portions, said annular rotor being mounted for rotation around a stator, said induction portion having fluid inlet means, said compression portion having wall and seal means for confining compressed combustible fluid within a restricted volume between said rotor and stator, said exhaust portion having reaction means, conveniently in the form of turbine means, and formed and arranged for driven engagement with combustion products from the combustion and exhaust phase so as to drive said rotor around said stator, said stator having a transversely extending chamber with a piston means reciprocably slidable therein for movement from a first retracted position to a second extended position for compressing fluid admitted to said chamber through said induction portion of said annular rotor, against the compression portion of said annular rotor; drive means formed and arranged for driving said piston means between said first and second positions so as to provide retraction of the piston means during the induction phase, movement of the piston means towards a substantially extended position during the compression phase, and substantially maintaining the piston means in its extended position for at least part of the exhaust phase; whereby when a combustible fluid is compressed in said chamber and ignited said compressed fluid explosively combusts and the combustion products expand into driving engagement with said turbine means in said combustion and exhaust phase for driving said rotor around said stator.

Thus with an engine according to the present invention one or more of greater torque, power and engine speed may be achieved in a relatively lightweight engine having substantially fewer parts than a conventional engine.

The induction, compression and combustion and exhaust portions are preferably more or less equi-angularly distributed around said annular rotor and may each take up a substantially equal angular extent of the annular rotor; one revolution (i.e. 360°) of the said rotor comprising three phases—induction, compression, and combustion and exhaust, i.e. each around 120° for a single cycle motor. Tuning of the engine to a particular application may result though in said portions having unequal angular extents. The rotary engine may however have two or more cyles or sets of said induction, compression and combustion and exhaust portions distributed around the annular rotor per revolution, e.g. by using two diametrically opposed pistons on the one common connection rod, or an enlarged circumference which allows further radial pistons and said rotor having two or more cycles or sets of said induction, compression, and combustion and exhaust phases around its circumference.

It will also be appreciated that the precise timing and relationship between movement of the piston and the induction, compression, and combustion and exhaust phases, may be varied to a greater or lesser extent. Thus, for example, retraction of the piston means could begin before the piston means reaches the end of the exhaust portion or after it passes the beginning of the induction portion of the annular rotor.

Conveniently said stator is in the form of a circular engine block through the centre of which rotates a drive shaft to which the annular rotor is attached and from which work generated by the engine may be extracted or output.

Two or more stators may be connected back to back to provide an engine having a plurality of annular rotors. Preferably a said plurality of annular rotors would be connected together to form a composite engine comprising a composite annular rotor and a composite stator having a common drive shaft.

Preferably injection of fuel and triggering of ignition of each compression stroke in any or all of the "cylinders" may be intermittently suspended whilst said engine is running, such that the capacity of said engine may be varied whilst running, to meet required power demand, or indeed spin/freewheel, without fuel input, when required to idle without load, with only the occasional fuelled and ignited compression phase to maintain that idling mode. For the same purpose, the amount of fuel injected into the cylinders in each cycle may be varied.

Preferably said induction portion is provided with impeller means formed and arranged for positively assisting a said combustible fluid through said inlet means and/or partially compressing said combustible fluid prior to or as it is admitted into the chamber. The retraction of the piston means during the induction phase acts as the primary means to draw said combustible fluid into said chamber.

Any of a plurality of fluids may be used for example hydrogen, oxygen, air, air/petrol mixture, air/diesel mixture. Preferably when air is used it is mixed with petrol or the like, or diesel just prior to, or in the chamber to form a combustible fluid mixture.

Any suitable form of ignition means may be used to ignite the combustible fluid in the chamber such as spark ignition by means of a spark plug mounted in said stator or compression ignition means in the form of an injector when diesel is used as a fuel for the engine. Any suitable form of injector means or carburation means may be used to inject/introduce a fuel into a compressed air fluid in said chamber or to air entering said chamber so as to form a said combustible fluid mixture.

Preferably said transversely extending chamber extends substantially across said stator and has a pair of diametrically opposed piston means therein connected together e.g. by being mounted at opposite ends of a common connecting rod driven by said drive means whereby when one piston means is in said first retracted position the other one of said piston means is in said second extended position. Where however an annular rotor has two sets of induction, compression and combustion and exhaust portions, then each piston means has a separate connecting rod driven by said drive means.

Preferably said drive means for driving said piston means between said first and second positions is a cam driven directly or indirectly by said drive shaft in the centre of the stator. Desirably said cam is formed and arranged to drive a said piston means from said second extended position towards said first retracted position during said induction phase; from said first retracted position towards said second extended position during said compression phase and to remain at said second extended position for a finite period while said compressed fluid combusts and the combustion products expand into driving engagement with said turbine means in said combustion and exhaust phase. The cam then repeats the above cycle. Where a said annular rotor has two or more sets or cycles of induction, compression and combustion and exhaust portions then said cam is formed and arranged to drive a plurality of said pistons through said cycle of induction, compression and combustion and exhaust simultaneously. Desirably said cam is provided with cam followers. Various other forms of drive means may be used including for example an epicyclic gear arrangement driven directly or indirectly by said drive shaft.

Preferably the shape of the crown of said piston means and/or the compression portion wall means of the rotor and/or the stator are formed and arranged to create a swirling motion in fluid admitted thereto, so as to improve the efficiency of combustion of the compressed fluid.

It will also be appreciated that the size and mass of the annular rotor provides a flywheel effect to the engine which helps to maintain momentum of the engine between successive combustion phases and thereby a smoother driving action.

Said seal means may be in the form of annular sealing strips/rings or tips extending around the inlet/outlet section of said chamber for sealing engagement with said compression portion of said annular rotor. Desirably said seal means are pressurised from behind, through pressure means from within the compression chamber by means of ducts, to force the said seal means outwards against the inner surface of the said annular rotor during the compression phase. Desirably said piston means are also provided with seal means in the form of piston rings to seal said piston means in said chamber.

Further preferred features and advantages of the present invention will appear from the following detailed description given by way of example of some preferred embodiments illustrated with reference to the accompanying drawings in which.

Figure 1:
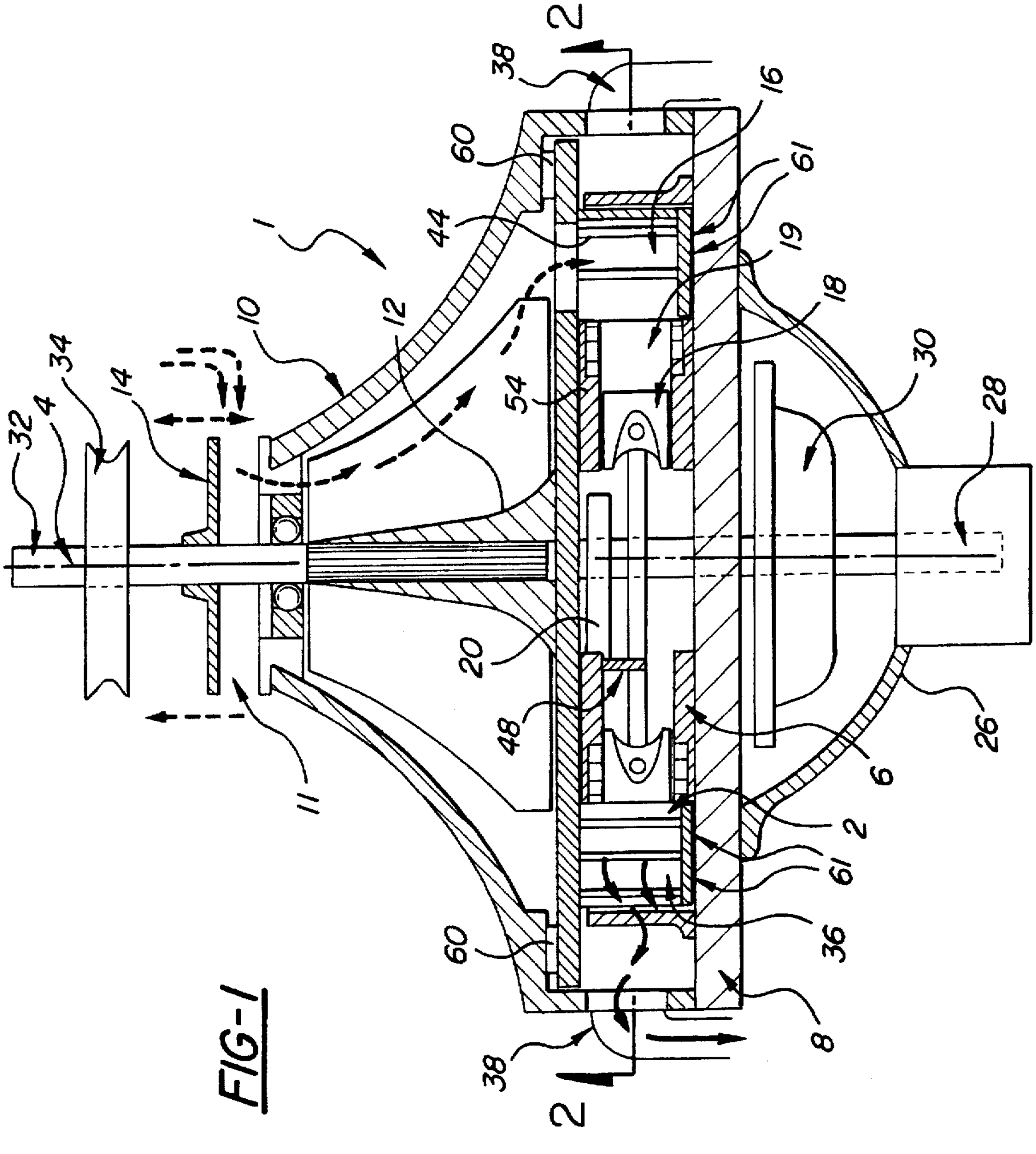
FIG. 1 is a longitudinal axial section through a rotary engine embodying the invention.

A rotary engine generally indicated by reference number 1, as shown in FIG. 1, comprises an annular rotor 2 mounted on a central driveshaft 4. The rotor 2 rotates around a stator engine block 6 mounted on an engine mounting plate 8 through which the drive shaft 4 rotates on bearings (not shown). An impeller housing 10 mounted on the engine mounting plate 8 enclosing an impeller 12 is attached to the central drive shaft 4.

Figure 2:
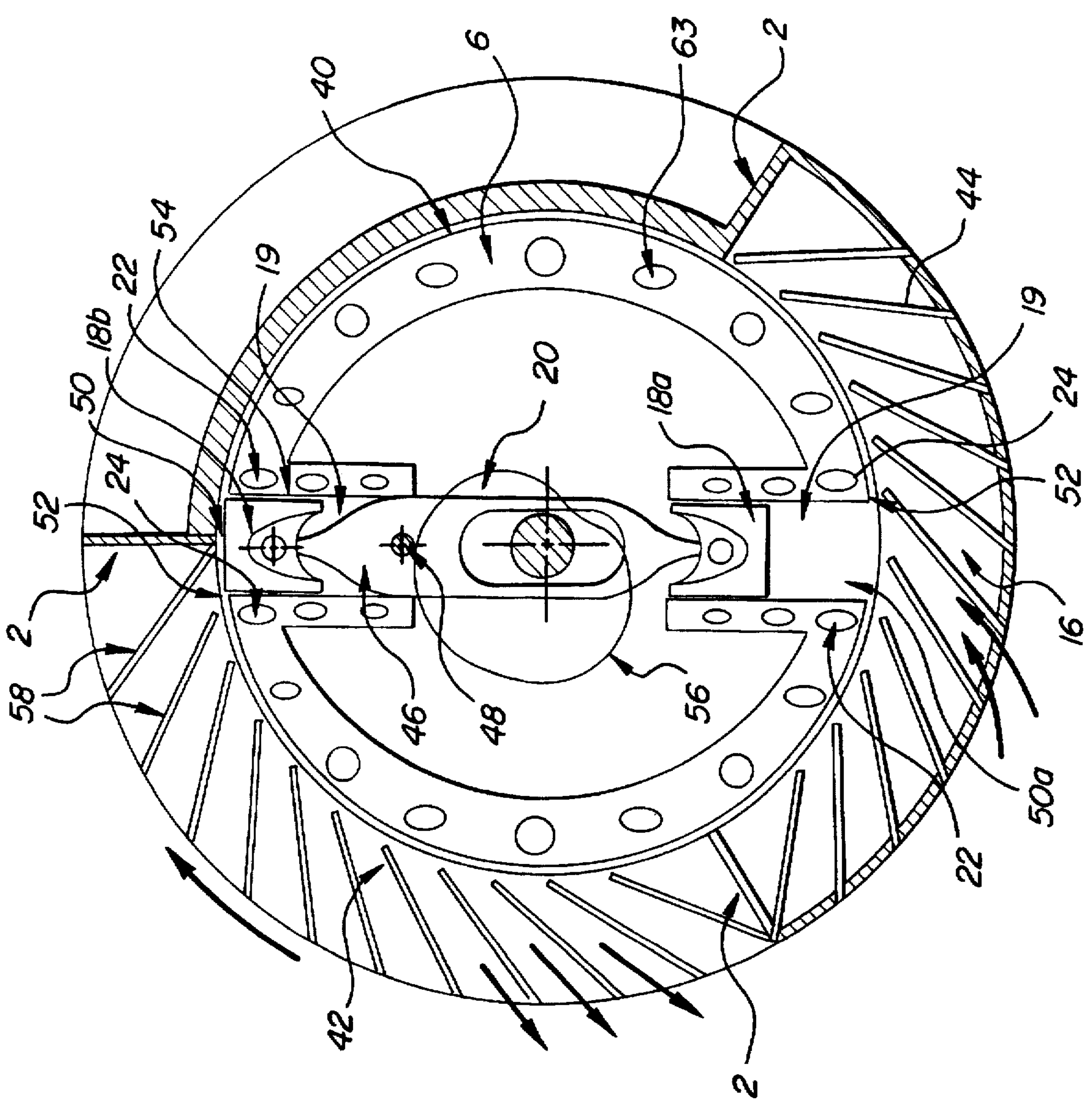
FIG. 2 is a transverse cross-section in the direction 2—2 of FIG. 1.

In more detail, air (shown in dotted line) is drawn in through throttle valves means 14 (i.e. a plate, adjustable axially, along the central shaft to open/close an annular aperture 11 into the impeller housing 10) by the impeller 12 into the induction section 16 of the rotor 2 (see also FIG. 2). As the rotor 2 rotates a piston 18 in a transverse radial cylinder 19 in the engine block 6 driven by a cam 20 (see also FIG. 2) induces that air into the chamber formed between the piston and the radial cylinder.

As air is being induced into the chamber, fuel is injected into it by injector(s) 24, mounted in the stator 6, upstream of each radial cylinder 19 (see FIG. 2). On completion of the induction stroke the piston starts a compression stroke, at the end of which it is maintained stationary by means of the cam 20, for a finite period of rotation while ignition occurs and subsequent exhaust of the expanding gases engage with the blades in the exhaust portion of the annular rotor, and thereby force the rotor to rotate. The compressed mixture of fuel and air may be ignited by a spark from a spark plug 22, (see FIG. 2) mounted in a recess in the cylinder wall such that, with or without a matching recess in the piston crown various aspect of lean burn technology may incorporated.

FIG. 1 also shows a bell housing 26 for housing at one end 28 of the drive shaft 4 a clutch assembly 30. At the other end 32 of the drive shaft 4 is a pulley wheel 34 from which may be driven, by suitable belt means, ancillary equipment such as a water pump, oil pump, power steering pump, alternator etc. (not shown). FIG. 1 also shows sealing means 60, between the bell housing and the rotor, and rotor sealing means 61, between the stator and the rotor, for sealing inlet gases from outlet gases.

Exhaust gases from the engine once exhausted from the exhaust section 36 of the rotor 2 are exhausted out of the engine 1 by an annular exhaust conduit 38.

With further reference to FIG. 2 the rotor 2 rotating (clockwise—shown by arrow) about the engine block 6 has an induction section 16, a compression section 40 and a combustion and exhaust section 42 each section extending around the rotor for 120°. Air is forced into the annular rotor 2 by the impeller blades 44 of the impeller 12 at the induction stage 16 and by the retracting movement of the cam 20 driven bottom piston 18*a*. The blades then carry the air to the mouth 50*a* of the cylinder during the induction stroke of each piston, thus filling the cylinder prior to the compression stroke. The induced air passes over the surface of the engine block 6 in which there is a recess (not shown) containing the fuel injector(s) upstream of the mouth 50*a* of the cylinder. As the rotor 2 spins around, the bottom piston 18*a* driven via a connecting rod 46 and a cam follower 48 by the cam 20, is displaced radially outwardly so as to act upon and compress air in the cylinder 19 against the compression section 40 of the rotor 2. Although not specifically shown in the drawing, it will be understood that the piston drive means may be formed and arranged so as to provide positive guiding of the pistons in both directions of travel thereof. The outlet/mouth 50 of the cylinder 19 is provided with an annular seal 52, e.g. a Dykes seal, and the pistons 18*a, b* are provided with piston rings 54, in a conventional manner, to seal the compressed fluid in the cylinder 19 against the piston 18*a* and against the compression section 40 of the rotor 2.

When the rotor 2 has rotated and the piston 18 fully extended (indicated by letter Z) the combustible fluid mixture of air and injected fuel (petrol, diesel) is ignited (at the equivalent of top dead center TDC). The eccentricity 56 of the cam 20 holds the piston in the extended position while the combustible fluid mixture is ignited by the spark plug 22 (see FIG. 2) so that the explosively burnt combustion products drive the turbine blades 58 of the exhaust section 42 of the rotor 2.

It may also be seen from FIG. 2 that in the illustrated embodiment, as one piston retracts to induce a fresh charge of air to be compressed the other piston is compressing the previously induced charge of air against the compression section of the rotor 2.

Figure 3:
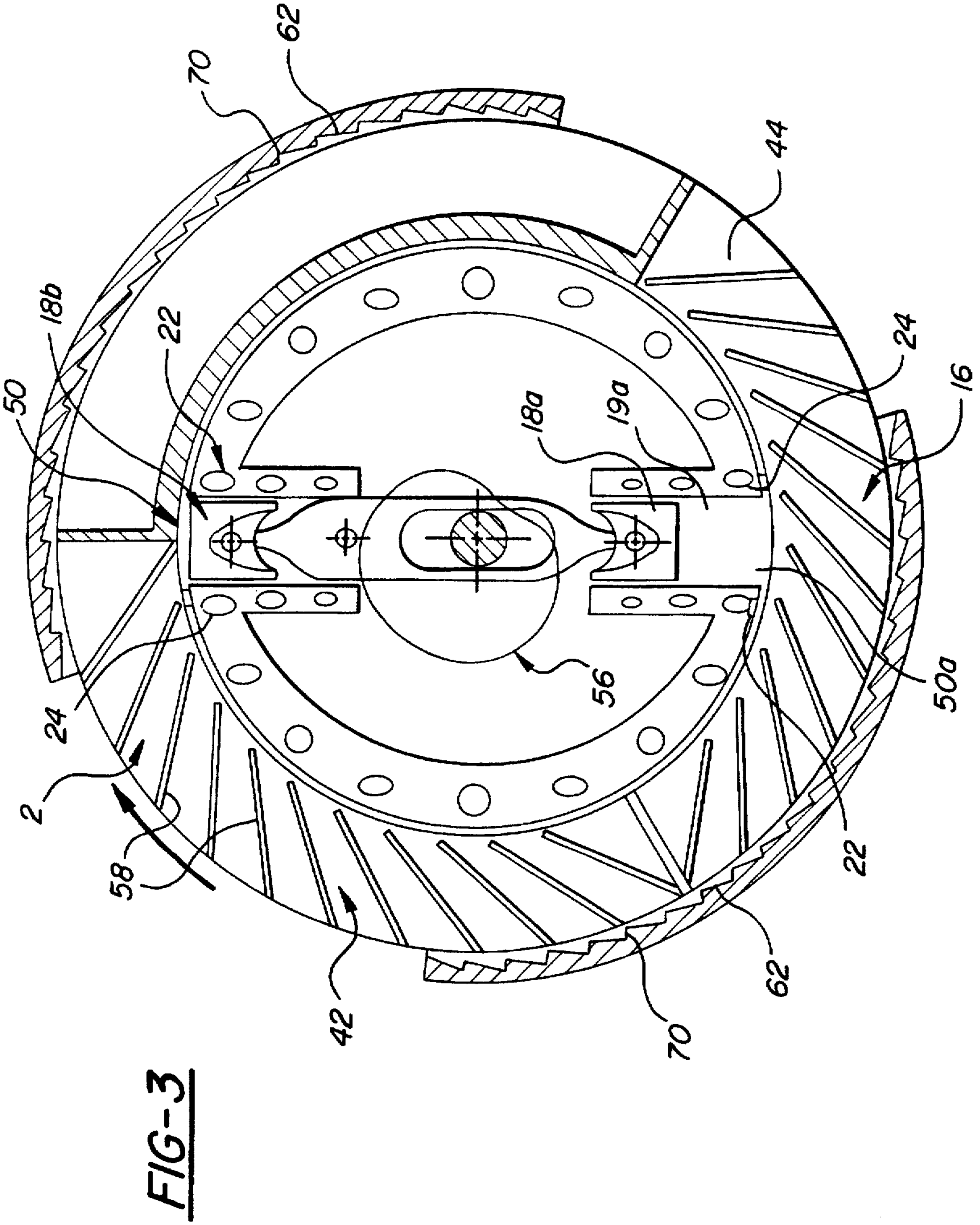
FIG. 3 is a transverse cross-section in the direction of line 2—2 of FIG. 1 of a second embodiment of the invention.

FIG. 3 shows a second embodiment of the invention, substantially similar to that shown in FIG. 2, but with an optional reaction wall 62. In more detail as shown in FIG. 3, exhaust gases from the cylinder are confined to pass between the outer surface of the engine block and a short, outer reaction wall 62, fixed circumferentially at the outer edges of the exhaust blades to the engine mounting plate such that the expanding gases do work against the inner surface of this wall, and the engine block surface, both of which may be serrated/grooved 70 such that the expanding gasses passing down the circumferential tube/tunnel continue to expand and do work on the exhaust blades passing between them and the temporarily stationary piston crown. Exhaust gases having passed through this restricting "tunnel" are exhausted into an annular ring conduit to which manifolds may be attached to conduct the gases to silencers and the open atmosphere beyond.

Figure 4:
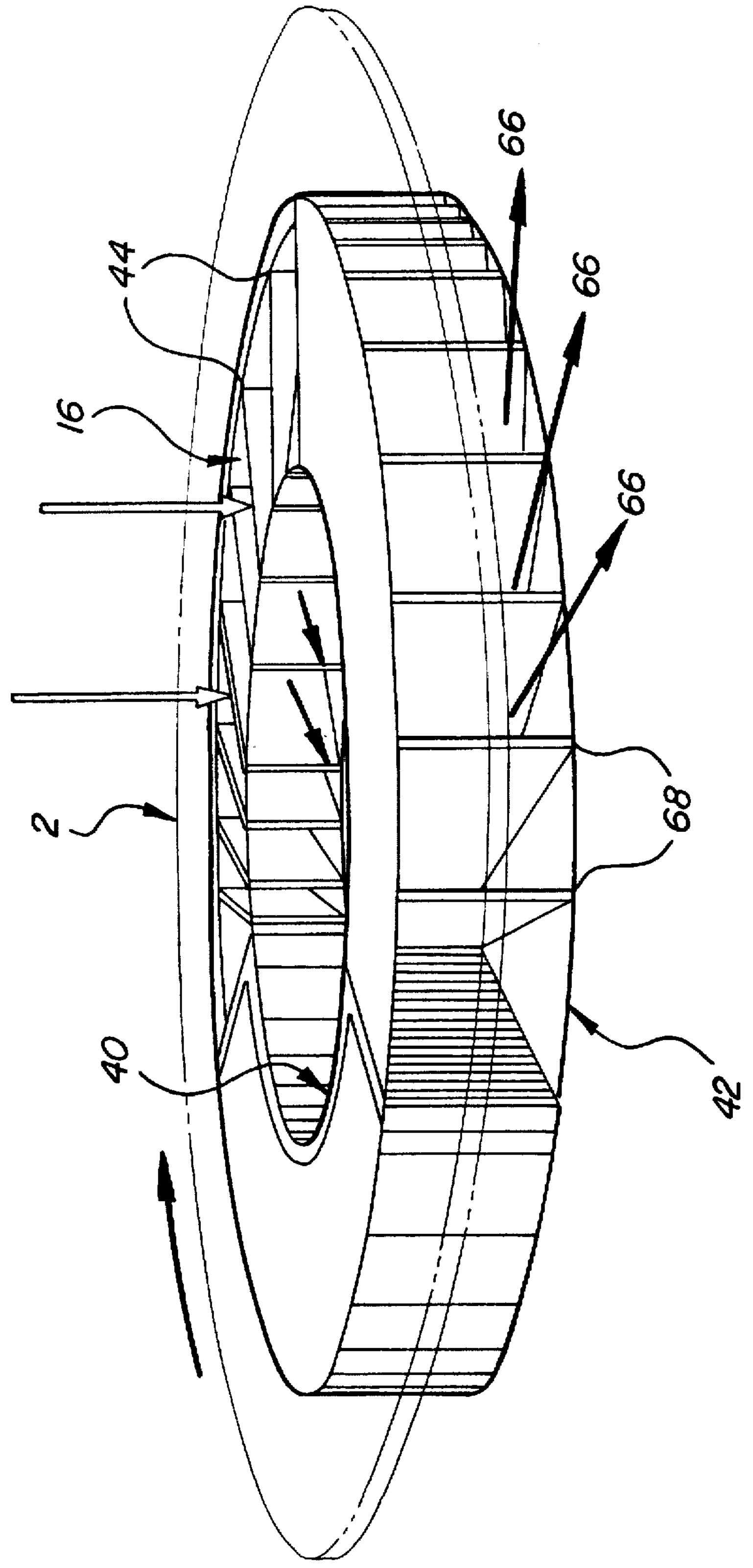
FIG. 4 is an isometric view of an annular rotor for use in a rotary engine embodying the invention.

FIG. 4 shows in more detail how air enters axially into the induction section 16 (and passes radially inwardly between the impeller blades 44) and how combusting exhaust gases 66 are exhausted radially outwardly through the turbine blades 68 of the combustion and exhaust section 42 of the rotor 2 for driving engagement thereof.

Figure 5:
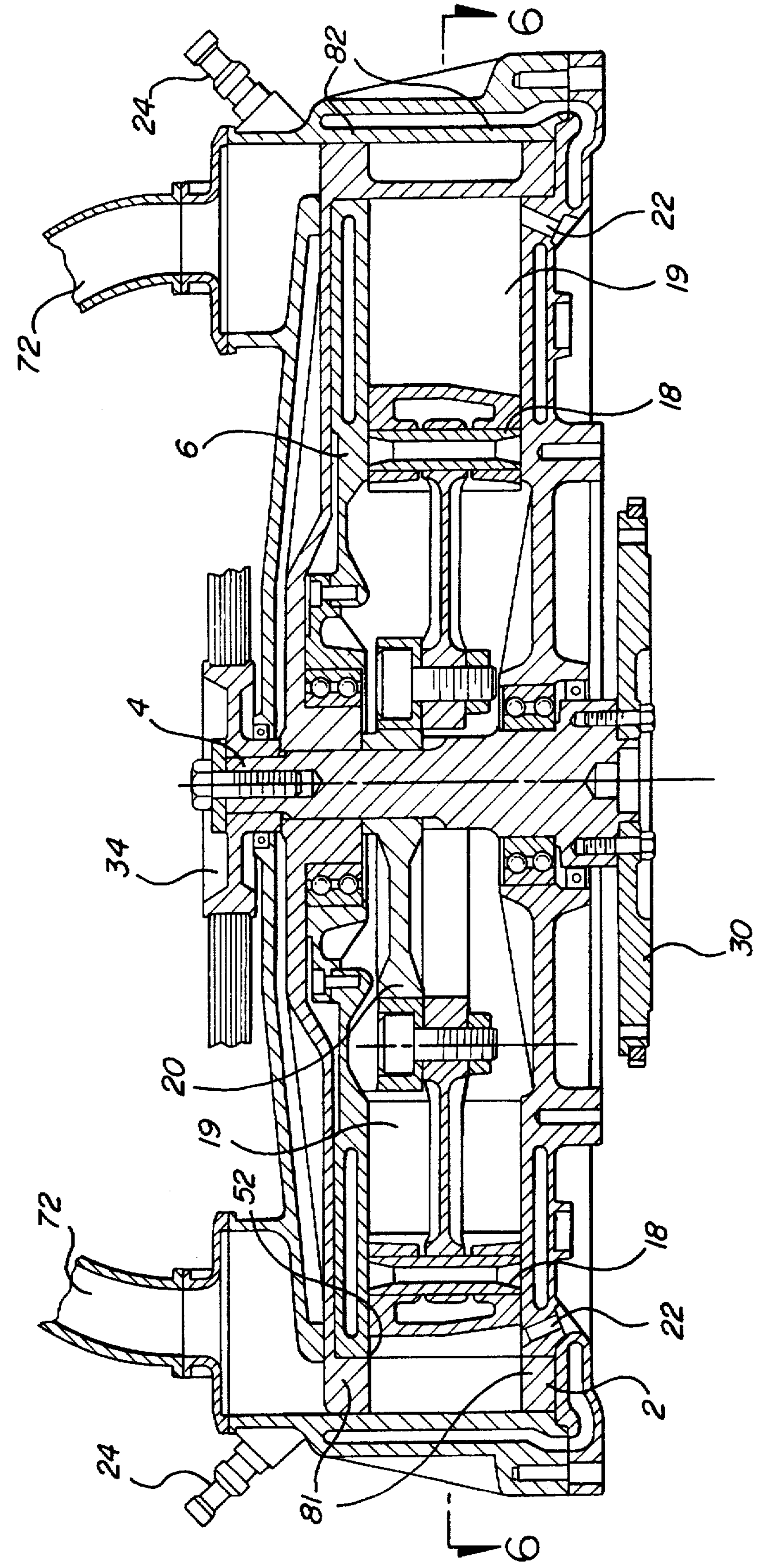
FIG. 5 is a longitudinal axial section through a rotary engine according to a third embodiment of the invention.
Figure 6:
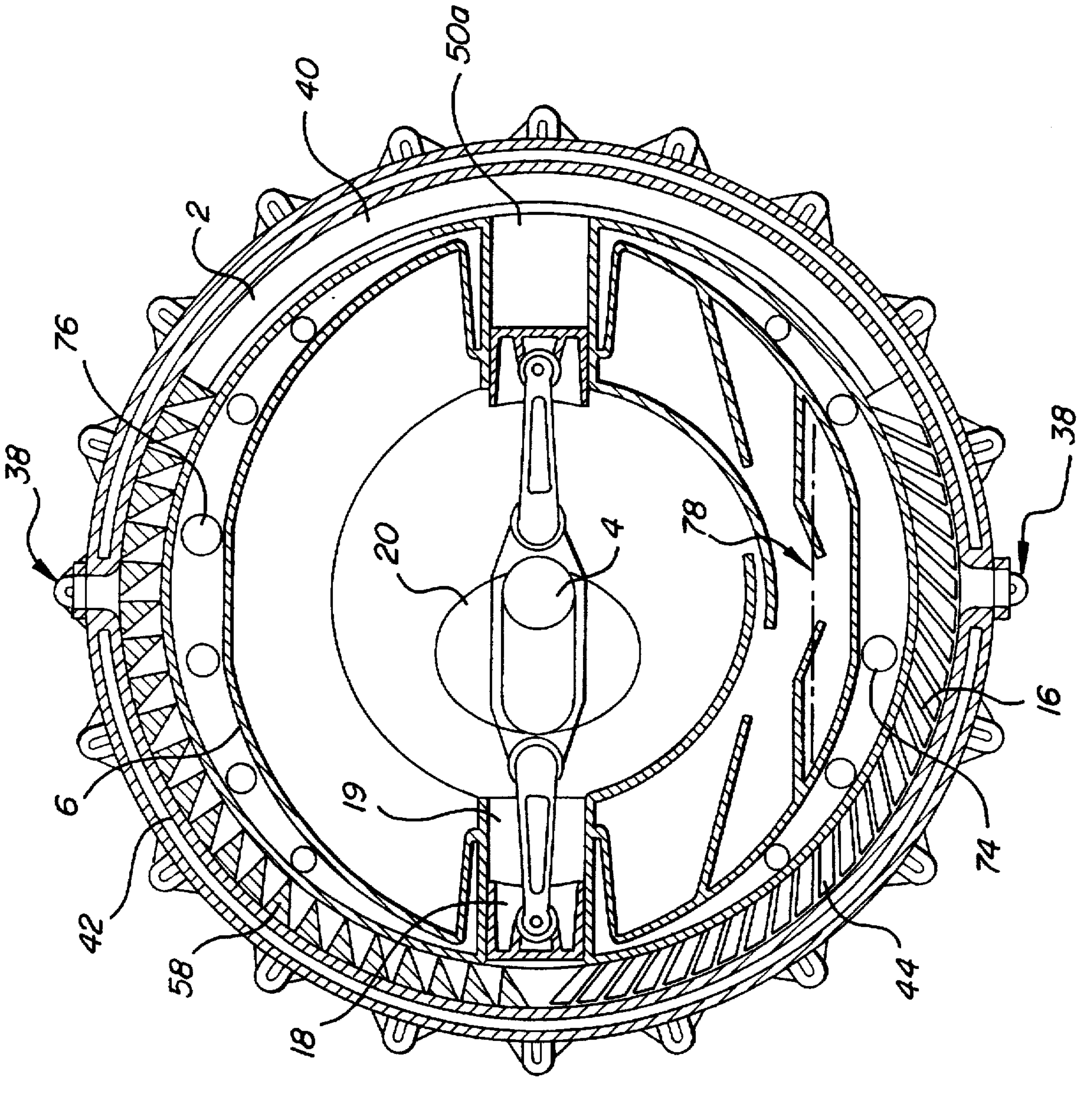
FIG. 6 is a transverse section in the direction 6—6 of FIG. 5.

FIGS. 5 and 6 show a third embodiment of the present invention in which reference numerals the same as those used in FIGS. 1 and 2 have been used to identify common parts. In the case of the third embodiment the design has been modified to reduce the overall axial length of the engine. Instead of the impeller shown in FIG. 1, a separate air intake 72 is provided for each cylinder, the air intakes being coupled to a throttle body and an air cleaner (not shown).

The engine is provided with a pair of annular seals 81 which extend circumferentially about the stator, one above and one below the cylinder openings. These seal the various phases of the rotor to the stator preventing the escape of combustible and exhaust gases. A further pair of annular seals 82 are provided which extend around the outer circumference of the rotor to seal the rotor to the engine casing.

In addition, the embodiment of FIGS. 5 and 6 comprises a number of water inlets 74 and outlets 76 provided in a cooling jacket of the stator for allowing water to be circulated through the stator to cool the engine. An oil reservoir 78 is provided in the interior of the stator for the purpose of lubrication.

Figure 7:
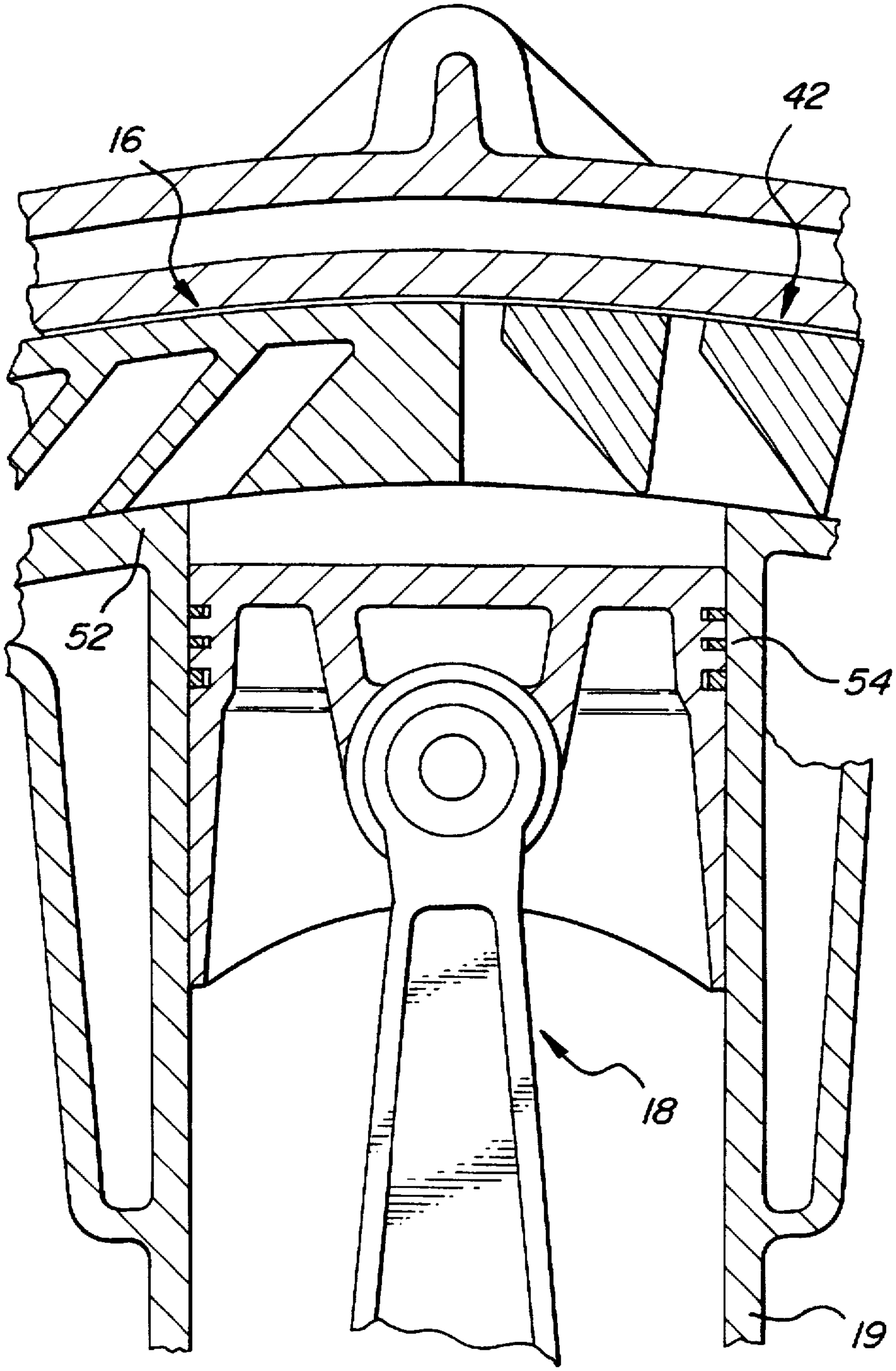
FIG. 7 is an enlarged view of the piston head of the engine of FIG. 5.

FIG. 7 shows an enlarged view of the piston head of the third embodiment and shows the ring seals 54 which seal the piston 18 to the inside of the cylinder 19 and the Dykes seal 52 which seals the outside face of the cylinder 19 to the rotor.

Figure 8:
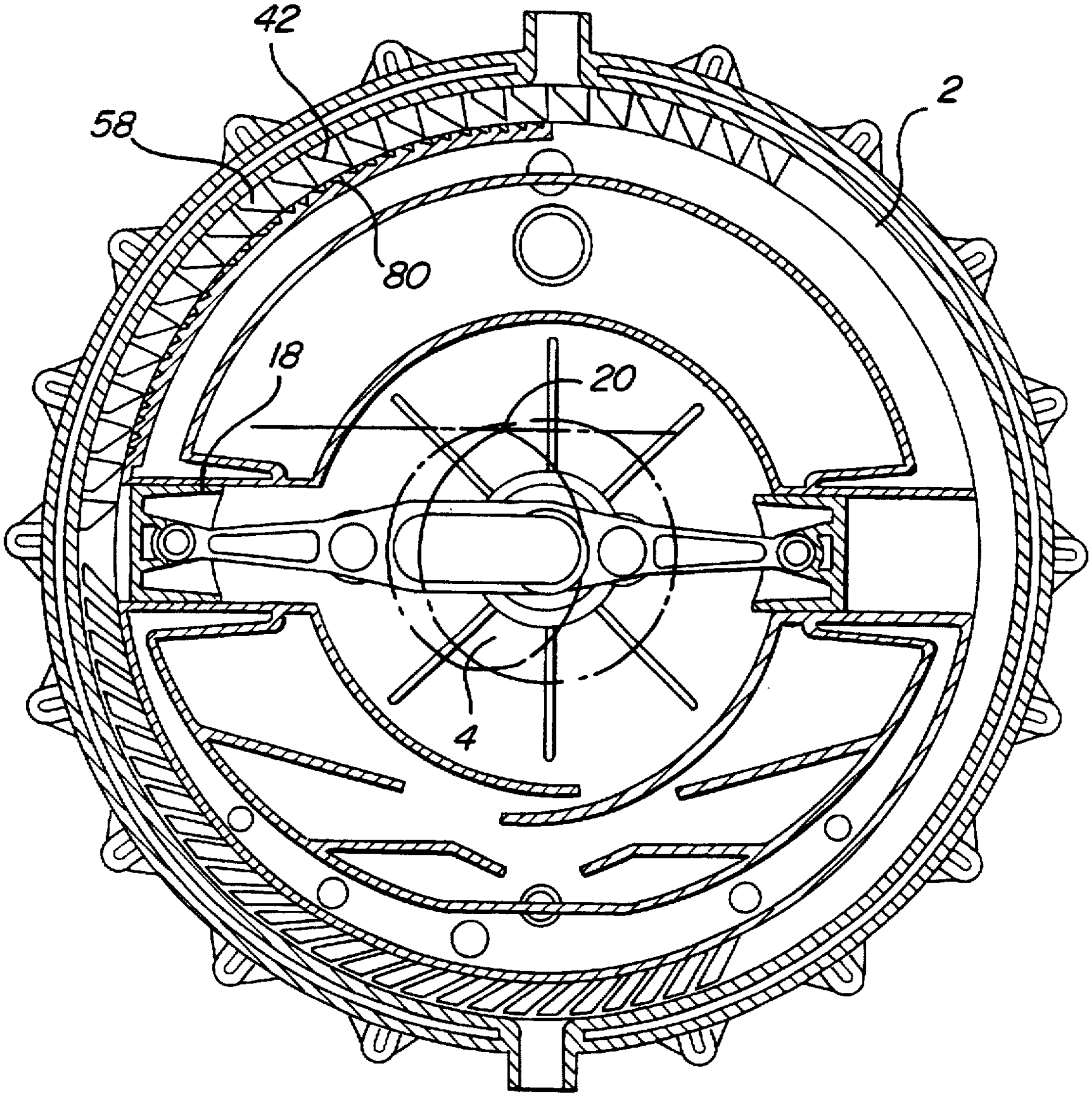
FIG. 8 is a transverse cross-section through a fourth embodiment of the invention.

FIG. 8 shows a modification to the engine of FIGS. 5 to 7 and which comprises the provision of a multiplicity of ratchet tooth formations 80 over a portion of the interior surface of the engine casing. These ratchets 80 facilitate expansion of exhaust gases trapped between the turbine blades 58 of the exhaust phase 42 of the rotor 2 providing further useful work.

It will be appreciated that various modifications may be made to the above described embodiments without departing from the scope of the present invention. Thus for example the impeller may be geared such that its rotational speed with respect to the main drive shaft may be variable in line with engine demand for air quantity or pressure. Further a simplified engine according to the invention may have no such impeller, the air being drawn into the cylinder through the induction section of the rotor and by normal induction of the piston action and ambient atmospheric pressure. The engine may be provided with cooling means and though not shown in detail, other than ports 63 in the stator/engine block 6 of FIG. 2, water cooling of the block 6 can be effected through those ports to the mounting plate and heat exchangers beyond. It may be desirable to have modified (notched or shortened) inlet phase blades to distribute the fuel evenly in the moving gases.

The exhaust port may be enlarged/elongated and/or moved around the circumference of the engine casing to a position between the cylinder openings. The orientation and spacing of the rotor turbine blades will be determined by the cylinder bore and the selected stroke length. It may also be possible to remove the blades from the induction portion of the rotor.

I claim:

1. An internal combustion engine comprising an inner stator (6) and an annular rotor (2) arranged to rotate around the stator, the stator comprising:

at least one combustion chamber (19) and fluid supply means (24) for introducing combustible fluid into the or each chamber;

compression means (18) for compressing combustible fluid in the or each chamber; and ignition means (22) for igniting compressed combustible fluid in the or each chamber, the rotor (2) having turbine reaction means (58) and the stator and rotor being formed and arranged so as to provide a pathway (42, 50*a*) for conducting combustion products from said chamber into driving engagement with the turbine reaction means so as to cause the rotor to rotate around the stator, characterised in that:

said chamber has an opening (50) at an interface between the stator (6) and the rotor (2);

the rotor has a compression sector (40) with a wall for closing said chamber opening (50) so as to confine compressed combustible fluid within the chamber (19) during a compression phase, and the rotor has an exhaust sector (42) provided with said turbine reaction means (58), for bringing said turbine reaction means into substantially direct communication with said chamber through said chamber opening during an exhaust phase.

2. An engine according to claim 1, wherein said rotor (2) has an induction sector (16), said induction compression and exhaust sectors being angularly distributed in the rotor (2) and interfacing in turn with said opening (50) of said at least one combustion chamber, the induction sector (16) being coupled to a fuel inlet for communicating fuel to the combustion chamber via said chamber opening (50) during an induction phase, said wall of the compression sector (40) closing said chamber opening (50) to confine fuel within the chamber during the compression phase, and the exhaust sector (42) bringing said turbine reaction means (58) into driven engagement with said combustion products following ignition of the compressed fluid during the exhaust phase.

3. An engine according to claim 2, wherein the induction, compression and exhaust sectors extend over substantially equal angular extents.

4. An engine according to claim 3, wherein the sectors each extend over an angle of substantially 120 degrees.

5. An engine according to claim 3, wherein each sector is divided into an equal number of sub-sectors, with the sub-sectors repeating around the rotor in the sequence induction, compression, and exhaust.

6. An engine according to claim 2, wherein the or each combustion chamber comprises a generally radially extending chamber with piston means (18) reciprocably slidable therein for movement from an extended position (Z) to a retracted position for drawing fuel into the chamber and moveable from the retracted position to the extended position for compressing fuel in the chamber.

7. An engine according to claim 6 and comprising drive means (4, 20) for moving the piston means (18) from the extended to the retracted position when the induction sector (16) is in communication with the chamber, for moving the piston means (18) from the retracted position to the extended position when the compression section (40) is in communication with the chamber, and for maintaining the piston means in substantially the extended position when at least a part of the exhaust sector (42) is in communication with the chamber.

8. An engine according to claim 7, having a drive shaft (4) passing through the center of the stator (6) and coupled to the rotor (2) for rotation therewith.

9. An engine according to claim 8, wherein the piston means (18) of the or each combustion chamber has a cam follower (48) which engages a cam (20) attached to the drive shaft (4) for producing the cyclical motion of the piston means (18).

10. An engine according to claim 9, comprising at least one pair of diametrically opposed combustion chambers.

11. An engine according to claim 10, wherein the cam (20) causes the piston means of the or each pair of combustion chambers to move in anti-phase to one another.

12. An engine according to claim 11, wherein the turbine reaction means comprises a multiplicity of turbine blades (58).

13. An engine according to claim 12 wherein seal means (52) are provided on the stator (6) and extend around the chamber opening (50) for sealing engagement with said wall of the compression sector during the compression phase.

14. An engine according to claim 13, which includes reaction wall means (62) formed and arranged so as to be disposed opposite outer ends of turbine blades constituting said turbine reaction means during the exhaust phase, and to facilitate therewith continuing expansion of combustion products in the exhaust sector (42) during rotation of the rotor (2), prior to exhaust of the combustion products from the engine.

15. An engine according to claim 14, wherein said reaction wall means (62) is disposed adjacent an outer circumferential surface of said rotor (2).

16. An engine according to claim 14, wherein said wall means is provided on said stator (6) adjacent an inner circumferential surface of said rotor (2).

17. An engine according to claim 14, wherein said reaction wall means (62) is provided with a plurality of ratchet tooth formations (70, 80).

18. An internal combustion engine according to claim 1, having induction, compression, and combustion and exhaust phases, said annular rotor (2) having angularly distributed induction, compression and exhaust portions (16, 40, 42), said induction portion (16) having fluid inlet means, said compression portion (40) having wall and seal means for confining compressed combustible fluid within a restricted volume between said rotor and stator, said exhaust portion (42) having said turbine reaction means (58), and formed and arranged for driven engagement with combustion products from the combustion and exhaust phase so as to drive said rotor around said stator, said stator having a transversely extending chamber with a piston means (18) reciprocably slidable therein for movement from a first retracted position to a second extended position (Z) for compressing fluid admitted to said chamber through said induction portion (16) of said annular rotor, against the compression portion of said annular rotor; drive means (4, 20) formed and arranged for driving said piston means between said first and second positions so as to provide retraction of the piston means during the induction phase, movement of the piston means towards a substantially extended position during the compression phase, and substantially maintaining the piston means in its extended position for at least part of the exhaust phase; whereby when a combustible fluid is compressed in said chamber and ignited said compressed fluid explosively combusts and the combustion products expand into driving engagement with said turbine reaction means (58) in said combustion and exhaust phase for driving said rotor around said stator.

19. A composite engine comprising a plurality of engines according to claim 18, the engines being banked in series along their axes of rotation.

* * * * *